(12) United States Patent
Chou et al.

(10) Patent No.: US 7,778,321 B2
(45) Date of Patent: Aug. 17, 2010

(54) METHOD FOR ADJUSTING PARAMETERS OF EQUALIZER

(75) Inventors: Yu-Pin Chou, Hsinchu (TW); Chao-Hsin Lu, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1185 days.

(21) Appl. No.: 11/165,029

(22) Filed: Jun. 24, 2005

(65) Prior Publication Data

US 2005/0286626 A1 Dec. 29, 2005

(30) Foreign Application Priority Data

Jun. 25, 2004 (TW) ............... 93118472 A

(51) Int. Cl.
*H03K 5/159* (2006.01)
(52) U.S. Cl. .............. 375/232; 375/233; 375/346; 375/350; 455/453; 381/103; 381/111; 327/552
(58) Field of Classification Search ............ 375/232, 375/233, 346, 296, 350; 381/103, 111; 398/177; 708/819; 455/453; 327/552; 600/534
See application file for complete search history.

(56) References Cited

U.S. PATENT DOCUMENTS

| | | | | |
|---|---|---|---|---|
| 3,763,359 A | * | 10/1973 | Cho et al. ............... 708/819 |
| 5,513,215 A | * | 4/1996 | Marchetto et al. ........ 375/233 |
| 5,995,565 A | * | 11/1999 | Tong et al. ............... 375/346 |
| 6,052,420 A | * | 4/2000 | Yeap et al. ............... 375/346 |
| 6,434,192 B1 | * | 8/2002 | Aizawa et al. ........... 375/232 |
| 6,932,774 B2 | * | 8/2005 | Nakatani et al. ......... 600/534 |
| 7,031,618 B2 | * | 4/2006 | Harasawa ................ 398/177 |
| 7,092,537 B1 | * | 8/2006 | Allred et al. ............. 381/103 |
| 7,593,494 B1 | * | 9/2009 | Ghobrial et al. .......... 375/350 |
| 2002/0034951 A1 | * | 3/2002 | Salonaho et al. ......... 455/453 |
| 2003/0016771 A1 | * | 1/2003 | Nuutinen et al. ......... 375/346 |
| 2005/0105641 A1 | * | 5/2005 | Cheung et al. ........... 375/296 |
| 2005/0218974 A1 | * | 10/2005 | Franca-Neto et al. ..... 327/552 |
| 2008/0219474 A1 | * | 9/2008 | Deruginsky et al. ...... 381/111 |

* cited by examiner

*Primary Examiner*—Sudhanshu C Pathak
(74) *Attorney, Agent, or Firm*—Thomas, Kayden, Horstemeyer & Risley, LLP

(57) ABSTRACT

A method for adjusting parameters of an adaptive equalizer makes use of a transmitted signal received by a receiving end to adjust parameters of an adaptive equalizer. First, signal strengths of a first frequency band and a second frequency band in the transmitted signal are detected. The signal strengths of the first frequency band and the second frequency band are then compared to get a compensation ratio, i.e., the total compensation quantity of the first frequency band to the second frequency band. Finally, the parameter setting of the equalizer is adjusted according to feedback of the compensation ratio. Optimum gain control of the adaptive equalizer can thus be accomplished to compensate signal attenuation to the transmitted signal caused by the channel.

13 Claims, 4 Drawing Sheets

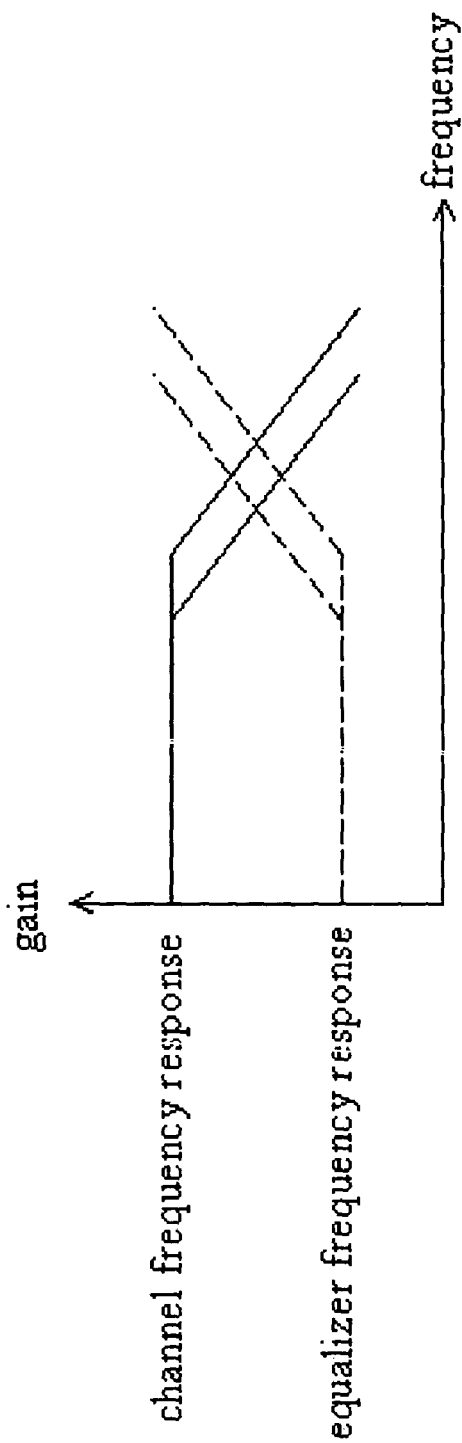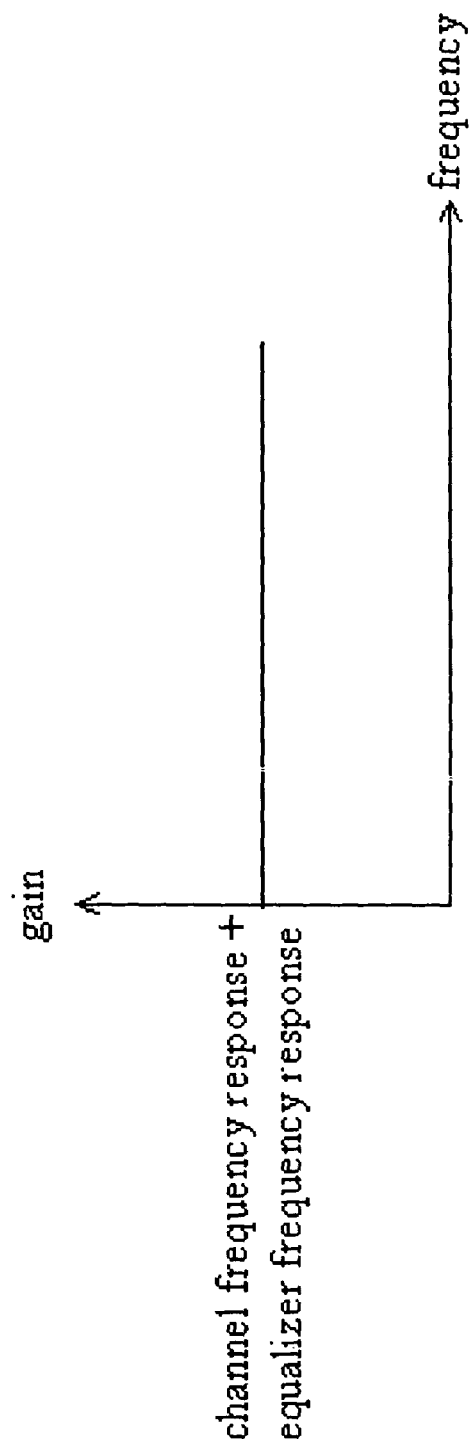

METHOD FOR ADJUSTING PARAMETERS OF EQUALIZER

FIELD OF THE INVENTION

The present invention relates to a control method applicable to an equalizer and, more particularly, to a method for adjusting parameters of an equalizer.

BACKGROUND OF THE INVENTION

Generally speaking, when signal transmits through a transmission channel, signal may attenuate and result in amplitude decay or waveform distortion. Therefore, an equalizer is usually used at the receiving end for compensating the attenuation caused by the transmission channel. Besides, a signal may comprise a plurality of signal components respectively corresponding to different frequency bands. Signal attenuation of each of the signal components may be different and thereby different compensations executed by the equalizer for different signal attenuation are necessary. The conventional equalizer usually multiplying the signal components respectively corresponding to the high and low frequency bands with different gains and then adding these signal components up to compensate the attenuation. However, because signal attenuation varies with different transmission distances, it's not suitable for the equalizer using the same setting to compensate signal attenuation caused by different transmission distances such as the lengths of a short cable and a long cable. Therefore, the problem of compatibility exists.

Another conventional equalizer is an adaptive equalizer, whose operation includes two modes: training and tracking. For an adaptive equalizer, a test sequence of a predetermined length is sent from a transmitting end to a receiving end with the adaptive equalizer. The adaptive equalizer can adjust corresponding parameter settings according to the received signal and the known sequence, and determine which one is the optimum setting through correctness of the bit-error-rate (BER) or the cyclic redundancy check (CRC). However, if the transmitting end of the channel can't send a test sequence, the optimum parameter setting applicable to the adaptive equalizer can't be found, not mentioning the compensation for the attenuation to the signal caused by the transmission channel.

SUMMARY OF THE INVENTION

It is therefore an object of the present invention to provide an adjusting method applied to an equalizer for solving the above-mentioned problems. An object of the present invention is to provide a method for adjusting parameters of an adaptive equalizer according to the signal received by a receiving end.

To achieve the above objects, the present invention provides a method for adjusting parameters of an adaptive equalizer according to the signal transmitted to a receiving end via a transmission channel. According to an embodiment of the present invention, the method comprising: detecting signal strengths corresponding to different frequency bands in the transmitted signal; comparing the signal strengths to obtain a compensation result; and adjusting the parameter setting of the adaptive equalizer according to the compensation result. The various objects and advantages of the present invention will be more readily understood from the following detailed description when read in conjunction with the appended drawing, in which:

BRIEF DESCRIPTION OF THE DRAWINGS

FIG. 3(a) shows gain versus frequency curves of the channel frequency response and the equalizer frequency response;

FIG. 3(b) shows that the sum of the transmitted signal gain and the equalizer gain is kept at a substantial constant value.

DETAILED DESCRIPTION OF THE PREFERRED EMBODIMENTS

Figure 1:
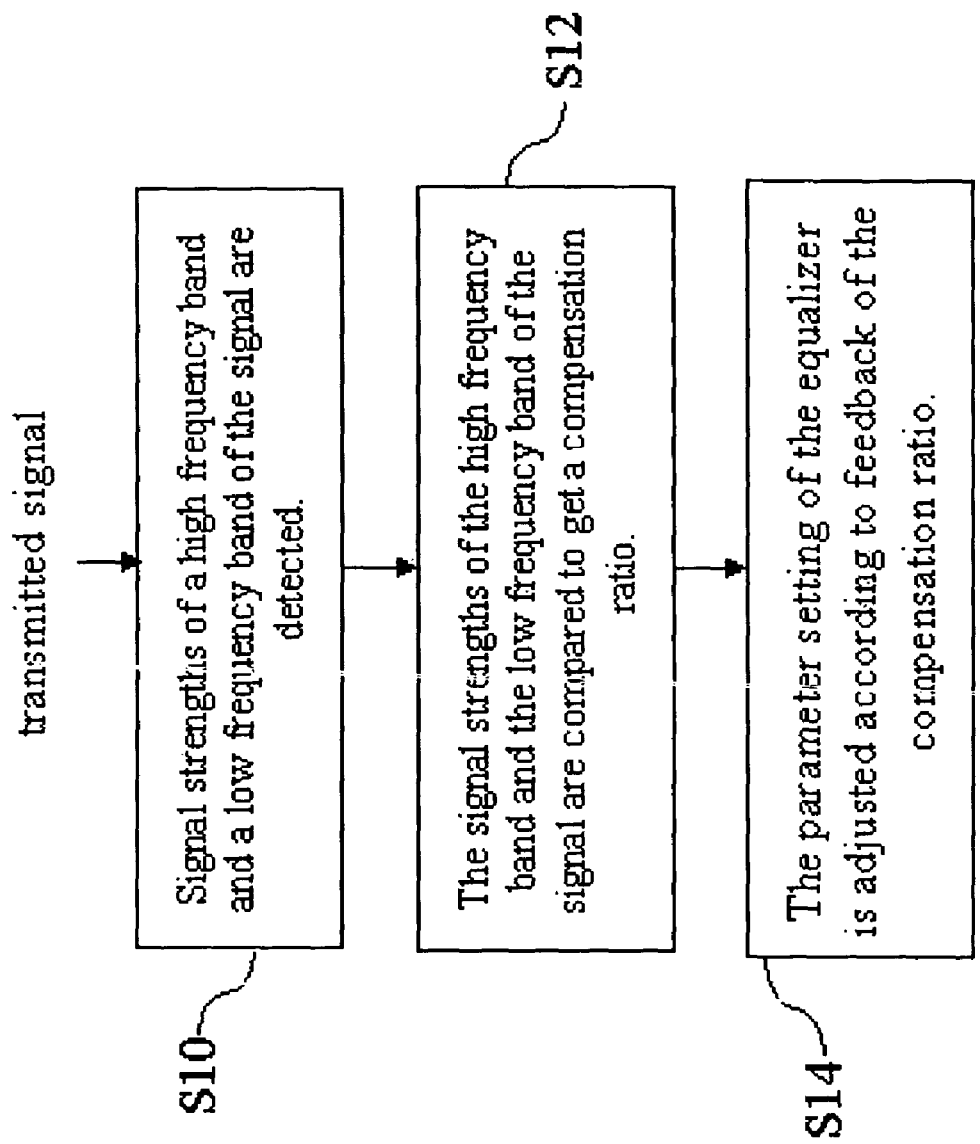
FIG. 1 is a flowchart of adjusting an adaptive equalizer according to an embodiment of the present invention.

FIG. 1 is a flowchart of adjusting an adaptive equalizer according to an embodiment of the present invention. As shown in FIG. 1, a transmitted signal is transmitted from a transmitting end to a receiving end via a transmission channel. Because the transmitted signal may easily attenuate during transmitting in the channel, it is necessary to compensate the transmitted signal through an equalizer implemented at the receiving end. Besides, the optimum parameter settings of the equalizer may be different for different transmission ways and distances, and thus proper adjustment to the parameters of the equalizer is necessary. Otherwise, in order to distinguish the optimum frequency response of a short cable from that of a long cable, signal strengths corresponding to different frequency bands in the transmitted signal may be kept within a certain range after the equalizer executing compensation.

Figure 2:
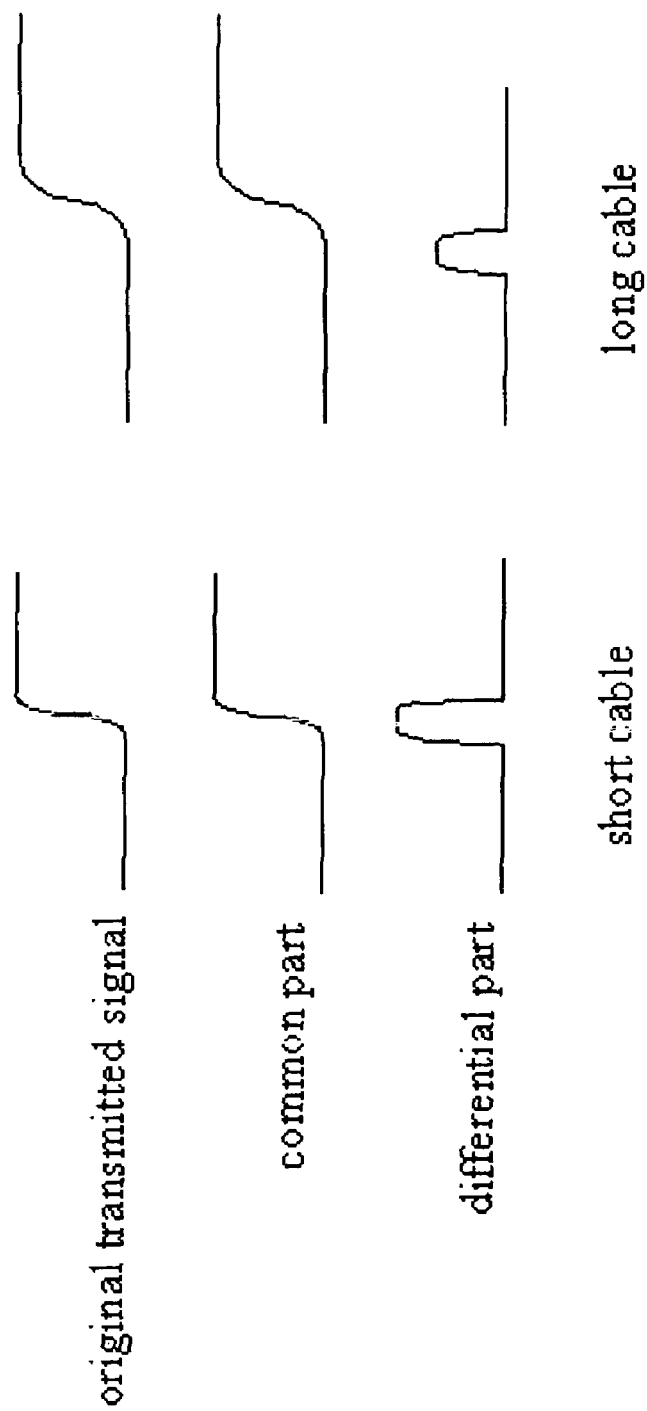
FIG. 2 is a diagram showing signal detection in the transmitted signal according to an embodiment of the present invention.

Please refer to FIG. 1. Signal strengths of the transmitted signal corresponding to the high and the low frequency bands are detected (Step S10). The signal strength can be one of the voltage strength, the current strength, the pulse strength, and the electromagnetic wave strength. The detecting results for a short cable and a long cable may be different, each of them comprising, for instance, a differential component and a common component of the transmitted signal as shown in FIG. 2. The differential and common components are respectively corresponding to a high frequency band and a low frequency band, and used for comparison in this embodiment.

Please refer to FIG. 1 and FIG. 2. After the signal strengths are detected, the differential component is compared to the common component, so as to obtain a compensation ratio (Step S12). In this embodiment, the magnitudes of the differential component and the common component shown in FIG. 2 are compared to obtain the compensation ratio between these two components. Consequently, the parameter setting like signal gain of the equalizer is adjusted according to the compensation ratio.

Please refer to FIG. 3(a). Gain of the transmitted signal in the transmission channel may attenuate differently in accordance with the frequency. In order to compensate this attenuation, the parameter setting such as the gain setting of the equalizer varies according to the frequency response of the transmitted signal. Moreover, in order to keep a better compensation effect, the sum of the equalizer gain and the transmitted signal gain may be kept at a substantial constant value no matter at what frequency, as shown in FIG. 3(b).

Besides, the parameter setting of the equalizer can be dynamically adjusted, or can be adjusted according to statistic results obtained within a period of time. Adjustment to the parameter setting of the equalizer may be accomplished by at least one of an integrator, a comparator, and an attenuator.

Figure 4:
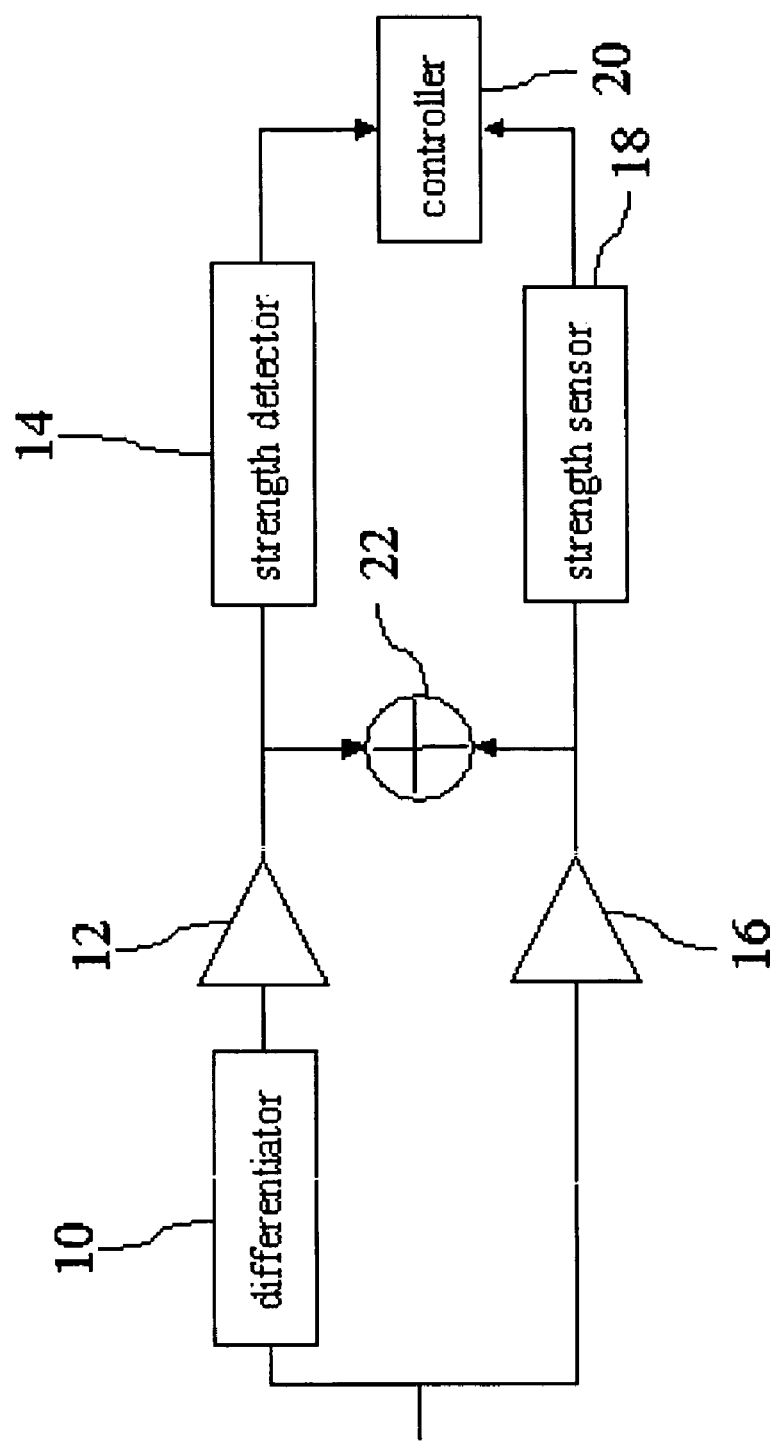
FIG. 4 shows a device for adjusting an adaptive equalizer according to an embodiment of the present invention.

FIG. 4 shows a device for adjusting an adaptive equalizer according to an embodiment of the present invention. As shown in FIG. 4, the device comprises a differentiator 10 for generating a differential component corresponding to a high frequency band according to the transmitted signal; an amplifier 12 for amplifying the differential component; and a strength sensor 14 for detecting the strength of the amplified differential component. The device also comprises an amplifier 16 for amplifying a common component corresponding to a low frequency band according to the transmitted signal and a strength sensor 18 for detecting the strength of the amplified common component. The detection results generated by the strength sensor 14 and 18 are respectively outputted to a controller 20 for comparison, so as to obtain a compensation result such as a compensation ratio between the differential and common components. Consequently, the amplifiers 12 and 16 can respectively adjust their gain values according to the compensation result and output the amplified signals to a logic such as an adder for summing up. Hence, the gain setting of the adaptive equalizer is corrected according to the signal components respectively corresponding to the high and low frequency bands.

In another embodiment of the present invention, the strength sensors can directly detect the strengths of the signal components corresponding to the high and low frequency bands instead of detecting the outputs of the amplifiers. Similarly, the controller generates the compensation result according to the detecting results such that the amplifiers can adjust their gain values according to the compensation result.

In another embodiment of the present invention, the controller outputs the compensation result to the logic, an adder for example, such that the logic can sum up the outputs of the amplifiers according to the compensation result. In this embodiment, the compensation result represents weighting values. Accordingly, the logic uses different weighting values for respectively multiplying each of the outputs of the amplifier, and then sums them up.

In another embodiment of the present invention, more than two signal components respectively corresponding to different frequency bands such as a high frequency band, a medium frequency band, and a low frequency band are distinguished and detected by strength sensors. Similarly, the controller can generate compensation result according to the detecting results such that the amplifiers can adjust their gain values in accordance with the compensation result.

It should be noted that any method making use of difference of signal strengths at different frequency bands to adjust parameters of an equalizer is intended to be embraced within the scope of the invention. Moreover, frequencies of different frequency bands can overlap one another.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A method for adjusting one or more parameters of an adaptive equalizer comprising the steps of:
    receiving a common part of a transmitted signal through a first path, the common part being the same as or distinct from the transmitted signal;
    receiving a differential part of the transmitted signal through a second path, the differential part being distinct from the common part and the transmitted signal;
    detecting a signal strength of the common part of the first path;
    detecting a signal strength of the differential part of the second path;
    utilizing a controller to receive the signal strengths of the common and differential parts;
    utilizing the controller to generate a compensation result by comparing the signal strength of the common part to the signal strength of the differential part; and
    adjusting at least a parameter of said equalizer according to said compensation result;
    wherein the differential part is obtained by a differentiator.

2. The method of claim 1, wherein the signal strengths of the common and differential parts are voltage strengths, current strengths, pulse strengths or electromagnetic wave strengths.

3. The method of claim 1, wherein said parameter is a signal gain.

4. The method of claim 1, wherein adjustment of the parameter is accomplished by at least one of an integrator, a comparator, and an attenuator.

5. The method of claim 1, wherein the parameter of the equalizer is adjusted dynamically or periodically.

6. The method of claim 1, wherein said compensation result can be adjusted according to different transmission distances of said transmitted signal.

7. The method of claim 1, wherein the sum of the gains of the transmitted signal and the adaptive equalizer is substantially frequency independent.

8. A device for adjusting a parameter of an equalizer comprising:
    a differentiator for generating a differential part of a transmitted signal, the differential part being distinct from the transmitted signal;
    a first strength sensor for generating a first detecting result according to a strength of a common part of the transmitted signal, the common part being distinct from the differential part;
    a second strength sensor for generating a second detecting result according to a strength of the differential part; and
    a controller, coupled to the first and second sensors, for generating a control signal by comparing the first detecting result to the second detecting result such that the parameter of the equalizer is adjusted according to the control signal.

9. The device of claim 8, further comprising:
    a first amplifier for amplifying the common part according to the control signal;
    a second amplifier for amplifying the differential part according to the control signal; and
    a logic for summing up the outputs of the first and second amplifiers.

10. The device of claim 8, further comprising:
    a first amplifier for amplifying the common part;
    a second amplifier for amplifying the differential part; and
    a logic for summing up the outputs of the first and second amplifiers according to the control signal.

11. The device of claim 8, wherein the controller generates the control signal dynamically or periodically.

12. The device of claim 9, wherein the gain values of the first and second amplifiers are determined by the control signal.

13. The device of claim 10, wherein the weighting values of the logic are determined by the control signal.

* * * * *